United States Patent [19]

Hotten

[11] 4,053,427
[45] Oct. 11, 1977

[54] CROSS-SULFURIZED OLEFINS AND FATTY ACID MONOESTERS IN LUBRICATING OILS

[75] Inventor: Bruce W. Hotten, Orinda, Calif.

[73] Assignee: Chevron Research Company, San Francisco, Calif.

[21] Appl. No.: 164,869

[22] Filed: July 26, 1971

[51] Int. Cl.² .................... C10M 1/38; C10M 3/32; C10M 5/28; C10M 7/36

[52] U.S. Cl. .................... 252/48.6; 252/395; 252/406; 260/139

[58] Field of Search ............ 252/45, 46.4, 46.6, 252/46.7, 48.6, 395, 406; 260/139

[56] References Cited

U.S. PATENT DOCUMENTS

| | | | |
|---|---|---|---|
| 2,179,061 | 11/1939 | Smith | 252/48.6 |
| 2,179,065 | 11/1939 | Smith | 252/48.6 X |
| 2,218,132 | 10/1940 | Lincoln et al. | 252/45 |
| 2,417,283 | 3/1947 | Zimmer et al. | 252/48.6 |
| 2,540,570 | 2/1951 | Cyphers | 252/48.6 X |
| 2,550,406 | 4/1951 | Cyphers | 252/46.6 |
| 2,820,013 | 1/1958 | Chapman et al. | 252/46.7 |
| 2,873,254 | 2/1959 | Wolfram et al. | 252/46.6 |
| 2,993,856 | 7/1961 | Heisig et al. | 252/48.6 X |
| 3,132,103 | 5/1964 | Teeter et al. | 252/46.4 |

Primary Examiner—Delbert E. Gantz
Assistant Examiner—Irving Vaughn
Attorney, Agent, or Firm—C. J. Tonkin; J. J. DeYoung

[57] ABSTRACT

Lubricating oil additives comprising a class of sulfurized mixtures of fatty acid mono esters and olefins are provided, which have the properties of extreme pressure lubrication, stability and noncorrosivity towards copper.

21 Claims, No Drawings

CROSS-SULFURIZED OLEFINS AND FATTY ACID MONOESTERS IN LUBRICATING OILS

BACKGROUND OF THE INVENTION

1. Field of the Invention

Boundary lubrication is characterized by control of friction and wear under high load conditions; it appears to depend on the properties of the lubricant other than its viscosity. Friction under boundary lubrication conditions generally tends to be higher than that usually associated with fluid film lubrication.

The kinetic coefficient of friction, $f_K$, is defined as the ratio of the force which resists sliding of one surface over another divided by the load between the surfaces. Under "dry" sliding conditions, coefficients of friction range from about 0.2 to 0.7. Satisfactory boundary lubrication is achieved when the coefficient of friction is reduced substantially below 0.2. The static coefficient of friction, $f_S$, is related to the force necessary to overcome inertia and is somewhat higher than $f_K$ under both dry and lubricated conditions.

Lubricants are often called upon to perform under conditions of high ambient temperature. Frictional coefficients of lubricated surfaces should be relatively constant up to a certain ambient temperature, termed "the transition temperature", T, which for the purpose of the present invention is the temperature beyond which the kinetic coefficient of friction rises above 0.2. Clearly, a superior lubricating composition has a transition temperature substantially higher than the ambient temperature under working conditions.

Wear is much more difficult to adequately measure and predict than friction. It can vary over a large range under controlled conditions depending on the load. Gears and many machine elements require quite low wear to achieve acceptable lifetimes. The addition of extreme pressure (EP) chemical additives to a lubricating oil can increase the load-carrying capacity of the lubricant many times over. EP additives are thus of considerable economic importance to industry.

There are four mechanisms acting alone and in concert which contributes to wear; they are corrosion, fatigue, plowing, and adhesion. Adhesion occurs under conditions of nearly atomic cleanliness and is probably concomitant to plowing. Plowing wear occurs when a hard, sharp surface irregularity, or third body (e.g., a dust particle), plows through the surface, removing the boundary layers and bringing clean surfaces into contact where they may adhere. Plowing also creates more ridges and surface irregularities which undergo plastic deformation until they fatigue, fracture and leave the surface. This surface metal fatigue mechanism, with or without plowing, is evidenced by micropitting of the surface.

Corrosive wear occurs when the surface reacts chemically with its environment, e.g., metal oxides are formed by reaction with oxygen or water in the air or lubricant, or reaction with the lubricant itself. Corrosive wear is often found where chemically active additives are used to achieve EP properties, but are found to react with the surface to its detriment, e.g., sulfurized and phosphosulfurized lubricant additives can be corrosive towards nonferrous materials.

The formation of films on metallic surfaces is thermodynamically favored, but the thickness of surface films ranges from a few hundredths of a microinch for single molecule layers of absorbed gases to several dozen microinches for thick films from oils with EP additives. The problem from the boundary lubrication standpoint is to provide a boundary film with the proper chemical and physical characteristics to control friction and wear, and the correct chemical properties to avoid detrimental surface corrosion.

As the last statement implies, a balance of chemical properties is required of EP additives. While it is known that certain sulfur, phosphorus and chlorine compounds can lead to enhanced load-carrying ability and the action of these additives is partly attributed to the formation of a chemical product film on the surface, the additive must not corrode the surface of alloys containing nonferrous metals.

It is known that in the art that additives comprising chemically active constituents such as sulfur, chlorine and phosphorus, will impart extreme pressure properties to a mineral oil. Sulfurized materials, in particular, have often been used. Such materials include various oils of mineral, animal and vegetable origin.

The process of sulfurization consists of heating under suitable conditions the proper ratio of sulfur to oil. Unfortunately, the products so obtained have often disagreeable auxiliary properties, such as a tendency to sludge, corrosiveness towards nonferrous metals, especially copper, incompatibility with other oil additives, turbidity, acidity, instability and a strong odor.

Sulfurized materials found in the prior art include sulfurized simple esters of fatty acids, U.S. Pat. Nos. 2,179,061 and 2,179,065; sulfurized tall oil, U.S. Pat. No. 2,631,129; sulfurized simple esters of tall oil, U.S. Pat. No. 2,631,131; sulfochlorinated mixtures of olefins, or acids, or esters, in the presence of an epoxy compound, U.S. Pat. No. 3,316,237; and sulfurized partial ester metal salts of unsaturated dibasic carboxylic acids, U.S. Pat. No. 3,501,413.

A particularly useful and valuable additive of animal origin is sulfurized sperm whale oil, U.S. Pat. Nos. 2,179,060, 2,179,063, and 2,179,066. Recently, the Secretary of the Interior placed an embargo on the importation of sperm whale oil into the United States by assigning all of the remaining whale species to the endangered species list. Since the United States uses 25-30 percent of the world's whale products, this should have an appreciable effect on efforts to conserve the remaining specimens. Thousands of whales and over a million barrels of oil per year are involved. Sperm whale oil is an important ingredient in cutting oils, gear oils, transmission fluids, soaps and as a lubricant for precision instruments.

One of the objects of the present invention is to find a highly satisfactory and efficient substitute for sulfurized sperm whale oil in lubricants which is free of disagreeable side effects.

Another object of this invention is to provide greases and lubricant compositions of superior demulsibility.

Another object is to provide new addition agents for greases and lubricants which impart valuable oiliness properties, including high pressure, antiwear and antifriction properties.

A still further object of this invention is to provide addition agents for lubricants and greases which are noncorrosive towards nonferrous metals, especially copper.

Yet another object of this invention is to provide addition agents for greases and lubricants which are stable, clear, nonsludging and compatible with other lubrication additives.

SUMMARY

Extreme pressure, antifriction and antiwear additives for lubricating oils are prepared by sulfurizing a mixture of $C_{10}$-$C_{25}$ olefins with fatty acid esters of a $C_{10}$-$C_{25}$ fatty acid and $C_1$-$C_{25}$ alkanol or alkenol. The fatty acid ester can be the tallate obtained from the esterification of derosinified tall oil. The preferred olefins are $C_{11}$-$C_{14}$ alpha-olefins such as those obtained by cracking wax.

In a preferred synthetic method, the fatty acids, alcohols and olefins are mixed and sulfurized to the extent of 3–15 percent sulfur by weight. The mole ratio of fatty acids to alcohols to olefins is about 1:1:1–2 in the mixture before sulfurization. We term the product "cross-sulfurized ester-olefins".

The cross-sulfurized ester-olefins are superior oiliness additives. They are superior, or equivalent, both to sulfurized sperm whale oil and to sulfurized simple esters in at least several important respects. It is found, for example, in the Falex EP Test that the cross-sulfurized ester-olefins withstand maximum loads several hundred pounds above those of the simple esters at the same percentage of sulfurization. They form stable lube oil compositions, are compatible with lead naphthenate, and are noncorrosive to copper. They also possess excellent antifriction and antiwear properties as determined by the 4-Ball Wear Test and the Godfrey Tribometer. They are thermally stable, nonsludging and nontoxic in ordinary use. They are superior to sulfurized sperm whale oil in demulsibility.

DESCRIPTION OF THE INVENTION

This invention is concerned with a novel class of oiliness agents which are prepared by sulfurizing a mixture of fatty acid esters of a $C_{10}$-$C_{25}$ fatty acid and a $C_1$-$C_{25}$ alkanol or alkenol with $C_{10}$-$C_{25}$ olefins. These products are termed "cross-sulfurized ester-olefins".

The cross-sulfurized ester-olefins are derived from fatty acids containing 10–25 carbon atoms. Examples of the fatty acids include unsaturated monoethenoid acids such as oleic acid, $C_{17}H_{33}COOH$, palmitoleic acid, $C_{15}H_{29}COOH$, petroselenic acid, $C_{17}H_{33}COOH$, erucic acid, $C_{21}H_{41}COOH$, gadoleic acid, $C_{19}H_{37}COOH$, vaccenic acid, $C_{17}H_{33}COOH$, and other naturally occurring and synthetic acids of the formula $C_nH_{2n-1}COOH$; andunsaturated polyethenoid acids such as linoleic acids, $C_{17}H_{31}COOH$. Also included are saturated acids such as n-undecanoic, $C_{10}H_{21}COOH$, lauric, $C_{11}H_{23}COOH$, myristic, $C_{13}H_{27}COOH$, palmitic, $C_{15}H_{31}COOH$, stearic, $C_{17}H_{35}COOH$, and other naturally occurring and synthetic acids of the formula, $C_nH_{2n+1}COOH$. Branched-chain fatty acids are also included, as well as substituted acids such as ricinoleic, $C_{17}H_{32}OHCOOH$ Examples of the alcohols which find use within the scope of the present invention are methyl alcohol, propyl alcohol, butyl alcohol, hexanol, octanol, undecanol, tetradecanol, etc. Monoethenoid and polyethenoid alcohols are also included, such as 1-hydroxy-3-hexene, 2-hydroxy-5,7-dodecadiene, 1-hydroxy-4,7-pentadecadiene, 2-hydroxy-10-docosene, etc. The alcohols can be straight-chain or branched-chain or partially branched and partially straight-chain alcohols. Substituted alcohols are also included, such as the 1,2-glycols, 1,3-glycols, etc.

The olefins within the scope of the present invention are aliphatic alkenes, particularly preferred are the cracked wax olefins, which are predominantly straight-chain $C_{10}$-$C_{25}$ alpha-olefins such as are obtained by cracking wax. Other olefins within the scope of this invention include monethenoid and polyethenoid olefins, conjugated olefins, and partially substituted olefins. The olefins may be straight-chain or branched, or they may be partially straight-chain and partially branched. Low molecular weight polyolefins also can be utilized.

A particularly preferred embodiment of this invention is the product of the reaction of oleic or linoleic acid with a $C_{10}$-$C_{20}$ alcohol, such as undecyl alcohol, when said product is mixed with a $C_{11}$-$C_{18}$ friction of cracked wax olefins and the mixture sulfurized to the extent of about 10 percent sulfur; the ratio of olefin to ester in the mixture being about 1–2:1.

It is an essential element of the invention that either the alcohol or the fatty acid be unsaturated. This is necessary for effective sulfurization. Although the usefulness of these materials as lubricating additives is independent of any particular supposition about the structure of the sulfurized products, it is believed that the sulfurization step introduces sulfur by forming linkages with —$(S)_n$— between ethylenic double bond positions. Thus it is believed that either the alcoholic or acidic portion of the ester molecule must be unsaturated to form effective linkages with the olefins. It will be shown that the inclusion of olefins is more economical and superior to the use of pure ester compositions.

The esters within the scope of the present invention are illustrated by isopropyloleate, ethyl linoleate, pentadecyl oleate, eicosyl linoleate, decenyl stearate, eicosenyl laurate, propyl linoleate, pentadecenyl linoleate, undecyl ricinoleate, pentadecyl tallate, etc.

Tall oil is a by-product of the sulfate process for the manufacture of wood pulp. It consists of about 50 percent resin acids. The resin obtained from various species of pine is called rosin, which is chiefly abietic acid, $C_{20}H_{30}O_2$. The remaining 50 percent of tall oil consists of unsaturated fatty acids, chiefly oleic and linoleic acids. Thus, "derosinified tall oil" is a convenient source of these unsaturated acids. Rosin is a source of the undesirable auxiliary properties of lube oil additives mentioned earlier when it is present in high percentage in tall oil prior to neutralization and/or sulfurization. Derosinfield tall oil is commerically available. For use in embodiments of the present invention, the derosinified tall oil contains less than five percent of rosin.

In a preferred embodiment of the invention, derosinified tall oil is reacted with an alkyl alcohol and mixed with cracked wax olefin. The mixture is sulfurized to the extent of 4–10 percent of sulfur by weight. In the most preferred embodiment of this invention, derosinified tall oil is reacted with a $C_{10}$-$C_{20}$ alkyl alkanol and mixed with $C_{11}$-$C_{18}$ cracked wax olefin in a mole ratio of 1:1–2 and the mixture sulfurized to the extent of 4–10 percent sulfur by weight.

Method of Preparation

In the practice of the present invention, there are many methods of preparing cross-sulfurized ester-olefins. At least one of these methods is both novel and simple. The methods which have been utilized are designated as the 1-Step, 1-½-Step, and 2-Step process, respectively.

In the novel 1-Step Process of the present invention a mixture of alcohol, fatty acid, olefin and sulfur is heated under an inert atmosphere for a period of from about 5 to about 25 hours and, preferably, from about 10 to about 20 hours. The reaction temperature is maintained at about 160° C. to about 180° C., and, preferably, about 165° C. to about 175° C. The reaction product is cross-sulfurized ester-olefin.

The 2-Step Process proceeds by acid-catalyzed esterification of the fatty acid as the first step. The ester is then mixed with the olefin and sulfur and cross-sulfurized as in the 1-Step Process. The 1½-Step Process comprises a noncatalytic esterification of the fatty acid, followed by the usual cross-sulfurization with olefin.

In the 1-Step Process, the mole ratio of olefin to acid to alcohol can vary from about 0.5:1:1 to about 4:1:1, but about 1–2:1:1 is the preferred ratio (see Table III). Similar mole ratios are preferred in the other processes.

Additive Medium

The compounds of this invention may be used singly or preferably in combination of two or more in an oil of lubricating viscosity. The lubricating oil can be any relatively inert and stable fluid of lubricating viscosity. Such lubricating fluids generally have viscosities of 35–50,000 Saybolt Universal Seconds (SUS) at 100° F. The fluid medium or oil may be derived from either natural or synthetic sources. Included among the natural hydrocarbonaceous oils are paraffin-base, naphthenic-base or mixed-base oils. Synthetic oils include polymers of various olefins, generally of from 2–6 carbon atoms, alkylated aromatic hydrocarbons, etc. Nonhydrocarbon oils include polyalkylene oxide, polyethylene oxide, aromatic ethers, silicones, etc. The preferred media are the hydrocarbonaceous media, both natural and synthetic. Preferred are those hydrocarbonaceous oils having viscosity $V_{100}$ of about 100–4000 SSU and particularly those having $V_{100}$ in the range from 200 to 2000 SSU.

The lubricating oil will be present at 75 or greater percent by weight of the final lubricant composition. In concentrates, however, the oil may be present as 10–75 percent by weight. These concentrates are diluted with additional oil prior to being placed in service to obtain the requisite concentration.

Other additives may also be present in the composition of this invention. Materials may be added for enhancing the EP effect of the additive, or providing other desirable properties to the lubricating medium. These include such additives as rust and corrosion inhibitors, antioxidants, oiliness agents, detergents, foam inhibitors, antiwear agents, viscosity index improvers, pour point depressants, etc. Usually these will be in the range of from about 0–5 percent by weight, more generally in the range from about 0–2 percent by weight of the total composition. Typical additional additives found in compositions of the present invention include lead naphthenates, phenolic and arylamine antioxidants, zinc dihydrocarbyl dithiophosphates, rust inhibitors, such as the metal sulfonates, foam inhibitors, such as the polymethylsiloxanes, etc.

EXAMPLES

For purposes of illustration we report some examples of preparation of the additives of this invention.

1-Step Process:

A mixture of 129 g. (about 0.6 mole) of tetradecanol-pentadecanol (Shell Chemical Company "Neodol 45"), 144 g. (about 0.6 mole) tall oil (Arizona Chemical Company, "Acintol FA-1 Special"), 111 g. (about 0.5 mole) cracked-wax olefin $C_{15}$–$C_{18}$ (Chevron Chemical Company, "Alpha-Olefin"), and 41 g. (about 1.3 moles) sulfur were heated for 19 hours at 168°–173° C. in a glass flask under a nitrogen blanket. The product was 394 g. of a dark viscous oil containing 8.6 percent sulfur by weight and having an acid number of 5.5 mg.KOH/g.

2-Step Process:

290 g. (about 1.1 moles) of tall oil, 189 g. (about 1.1 moles) of n-undecanol (Gulf Oil), and 10 g. of polystyrenesulfonic acid resin (Rohm & Haas Company, "Amberlyst 15"), were stirred at 128°–132° C. under nitrogen with condensor and water receiver for 5 hours and the resin catalyst was then filtered off. The product was 428 g. of a tan oil when an acid number of 5 mg.KOH/g. 240 g. (about 0.5 mole) of the undecyl tallate product, 88 g. (about 0.5 mole) of cracked wax olefin, $C_{11}$–$C_{14}$, and 41 g. (about 1.3 moles) of sulfur were stirred under nitrogen at 171°–173° C. for 12 hours. The resulting dark brown oil weighed 360 g. and contained 11 percent of sulfur by weight.

1½-Step Process:

This process consisted of noncatalytic esterification followed directly by sulfurization. 288 g. (about 1.1 moles) of tall oil and 223 g. (about 1.3 moles of n-undecanol were stirred for nine hours at 169°–174° C. 110 g. (about 3.5 moles) of sulfur and 445 g. (about 2 moles) of cracked-wax olefin, $C_{15}$–$C_{18}$ were then added. The mixture was stirred at 168°–173° C. for nineteen hours. The resulting dark brown oil weighed 1,016 g., had an acid number of 5.3 mg.KOH/g., and contained 9.9 percent sulfur by analysis.

LUBRICANT PERFORMANCE

The lubricating oil additives of this invention have six fundamental properties which have been subjected to laboratory testing. These properties have been compared with those of other known EP additives.

1. The additives have been tested for EP properties by means of the Falex Machine Test. In the Falex test, stationary vee-blocks are pressed on either side of a rotating steel shaft by a nutcracker arrangement of lever arms. Test specimens are immersed in a tank of test lubricant which is at a known temperature. Loading is automatically increased until seizure occurs. This failure point is indicated by shearing of the pin holding the vertical shaft. The load at failure in pounds is taken as a quantitative measure of the EP property of the coil composition. Mineral oils may fail at 600–900 pounds. Oils with moderate EP additives will fail at 1000–2000 pounds and very effective EP additives will permit loadings in excess of 3000 pounds.

2. The additives have also been tested for antiwear properties under boundary lubrication conditions by means of the well-known 4-Ball Test. In this test three one-half inch diameter steel balls are clamped together and immersed in the test lubricant. A fourth ball is then rotated at about 1800 rpm in contact with the other three balls. A 20–50 kg. load is applied, forcing the rotating ball against the three stationary balls. The test is run for 60–30 minutes and the sizes of the wear scars on the three stationary balls are measured and the average scar size in millimeters reported. The smaller the scar, the greater the antiwear properties of the test lubricant. For example, the base oil gives a wear scar of 0.76 mm. at 20 kg. load and lubricants which give a wear scar of less then 0.5 mm. are considered acceptable antiwear lubricants; it is preferred that the wear scar be on the order of 0.3–0.6 mm. Lubricants which give 4-ball scars in the latter range are generally found also to give good performance in the L-38 Gear Lubrication Test (Federal Test Methods Standard 791A, Method No. 6506-T), a well-known test for evaluating gear lubricants. Both the Falex and the 4-Ball tests are described and referenced in *American Association of Lubrication Engineers Standard Handbook for Lubrication Engineers*, Chapter 27, James J. O'Connor, Editor, McGraw-Hill, New York, 1968.

3. Antifriction properties of the additive as a function of temperature are determined from tests conducted with the Godfrey Tribometer. The Godfrey Tribometer is described in ASLE Transactions 7, 24–31 (1964). In the present tests on that instrument, a loaded (1 kg.) bearing ball rubs or slides at low speed against a rotating steel ring lubricated with test lubricant and held at known temperature. The kinetic coefficient of friction, $f_k$, and the static coefficient of friction, $f_S$, are measured as well as the transition temperature, T, at which $f_K$ rises above 0.2. Base oil-lubricated specimens give coefficients of about 0.15–0.3. Satisfactory boundary lubrication is achieved when the coefficient is reduced below 0.15–0.20. The transition temperature should be high and is considered satisfactory if above 150° C.

4. A stability test is performed by heating a lubricating oil composition containing the usual additives and the test additive to about 150° F. and allowing it to stand at this temperature until a sludge or visible amounts of particulate reaction products are formed. Lead naphthenate will be present in the oil formulation to about 3.6 percent by weight. To pass this test, the time before appreciable sludge formation should be in the order of 5 days. In a more severe stability test, a 2 percent by weight composition of additive in oil is held at 300° F. The additive passes this stability test if it fails to form an appreciable amount of sludge before about 4 days.

5. The copper strip test is very important since it is the criterion for lack of corrosivity towards nonferrous metals. A copper strip is immersed into 2percent by weight composition of test additive in oil at 250° F. for three hours. The degree of discoloration of the copper strip is obtained from a comparison chart. A rating of 1a indicates a very low degree of discoloration and consequently slight corrosivity of the additive towards copper. A test of 1b or 2a is less satisfactory etc., etc. This is an ASTM Test Method D-130.

6. Large amounts of water are used in some industrial operations (e.g., cooling and descaling water during hot-rolling) and eventually it finds its way into the oil system. Thus, a multi-purpose industrial gear and lubricant additive must have, in addition to good EP properties, excellent demulsibility characteristics. It is found that the use of demulsifiers as additional additives in lubricating oil packages can serve to produce a definite decrease in EP properties. Demulsifiers are said to be antagonistic in some cases to the EP performance when contrasted to the base additive. It was found that the demulsibility of cross-sulfurized olefin-esters is unpredictably superior to that of sulfurized sperm whale oil. That is, the cross-sulfurized olefin-esters are unexpectedly much more demulsible than sulfurized sperm whale oil. This important requirement for gear oils and other industrial oils is supported by the demulsibility test given in Table I. The test of demulsibility is the ASTM D-1401 test at 180° F. In this test, a mixture of 40 ml. $H_2O$ and 40 ml. test oil is stirred in a graduated cylinder and allowed to stand for observation of water separation. The volume of clear water separated during 30 minutes is given in the last column, Table I. The test results show the clear superiority of the cross-sulfurized olefin-esters over sulfurized sperm whale oil in demulsibility.

Table I presents a compilation of test data obtained for various ratios of olefin/ester in comparison with sulfurized sperm whale oil (SSWO). In general, satisfactory EP lubricating oils are obtained only when an appreciable amount of sulfurized ester is present. However, a quite surprising improvement in oiliness is obtained by cross-sulfurizing an amount of olefin with the ester in the ratio of about 1–2:1. Especially satisfactory results are obtained from the one-step process in which acid, alcohol and olefin are mixed and sulfurized.

TABLE I

| Composition[1] | | | Ratio Olefin/Ester | Sulfur Content[2] | Process[3] | Copper Strip[4] | Stability[5] | 4-Ball[6] | Falex[7] | Tribometer $f_S$ | $f_K$ | T | Demulsibility[10] |
|---|---|---|---|---|---|---|---|---|---|---|---|---|---|
| Sulfurized Sperm Whale Oil | | | — | 10 | — | 1a | 3–6 | 0.38–0.44 | 1400–1500 | 0.13 | 0.10 | 150–200° C. | 0 |
| Base Oil | | | — | — | — | — | 7 | 0.76 | 950 | — | — | — | 40 |
| Acid | Alcohol | Olefin | | | | | | | | | | | |
| Tall Oil | Undecyl | CWO 11–14[9] | 0:1 | — | 2 | 1a,b | 4 | — | — | 0.14 | 0.10 | >150° | — |
| " | " | " | 1:1 | 11 | 2 | " | 5 | 0.37 | 1230 | 0.14 | 0.10 | 120° | — |
| " | " | CWO 15–18 | 0:1 | 9.4 | 2 | " | 3–6 | — | 1330 | — | — | — | — |
| " | " | " | 1:1 | 8.6 | 1½ | " | 10 | 0.37 | 1370 | 0.15 | 0.11 | 160° | — |
| " | " | " | 1.5:1 | — | 2 | " | 6 | 0.34 | 1180 | 0.14 | 0.11 | 190° | 39 |
| " | " | " | 2:1 | 9.9 | 1½ | " | 5 | 0.38 | 1460 | 0.13 | 0.10 | 180° | — |
| " | Tetradecyl-Pentadecyl | " | 0:1 | 7.3 | 2 | " | 11 | — | 1250 | — | — | — | — |
| " | " | " | 1:1 | 8.6 | 1 | " | 7 | 0.36 | 1450 | 0.14 | 0.11 | 205° | 38 |
| " | " | " | 1.5:1 | — | 2 | " | 3–6 | 0.35 | 1280 | — | — | — | — |
| " | " | " | 2:1 | 10 | 2 | " | 4 | 0.38 | 1110 | — | — | — | — |
| " | " | " | 1:0 | 12 | 2 | " | 3–6 | 0.36 | 950 | — | — | — | — |

[1]Composition is 2% additive by weight (unless otherwise noted) in solvent refined neutral oil, $V_{100}$ = 480 SSU.
[2]Percent sulfur by weight of sulfurized product.
[3]1-step process comprises mixing acid, alcohol and olefin together and sulfurizing; 2-step process comprises acid catalyzed esterification before sulfurization; and 1½-step process comprises noncatalytic esterification followed by sulfurization.
[4]Copper strip immersed in composition at 250° F. for 3 hours.
[5]Composition at 300° F. Days to appreciable sludge formation.
[6]Scar width in mm. in 4-Ball Test (20 kg., 1800 rpm, 1 hour).
[7]Load in pounds at failure.
[8]4.5% by weight composition in solvent refined neutral oil, $V_{100}$ = 126 SSU.
[9]$C_{11}$–$C_{14}$ cracked wax olefins.
[10]ASTM D-1401 at 180° F.

Table II shows the comparison as oiliness additives with SSWO of the products of the 1-step and 2-step processes. The 1-step process is shown to be not only simple and more efficient, but satisfactory in comparison with SSWO and surprisingly superior to the 2-step product in the Falex test.

TABLE II

| Tests[1] | Cross-Sulfurized Tallate-Cracked Wax Olefin | | |
|---|---|---|---|
| | SSWO[2] | 2-Step Product | 1-Step Product |
| Copper Strip | 1a | 1b | 1a |
| Stability | 3–4 | 2–6 | 5–7 |
| 4-Ball | 0.36–0.44 | 0.35 | 0.36 |
| Falex | 1400–1600 | 1250 | 1450 |
| Tribometer: | | | |
| $f_S/f_K/T$ | 0.13/0.12/180° C | — | 0.14/0.11/205° |

[1]See footnotes to Table I.
[2]Sulfurized Sperm Whale Oil.

Table III compares chemical mixtures of sulfurized ester-olefins, that is, cross-sulfurized ester-olefins, to mere physical mixtures, that is, mixtures of separately sulfurized esters and olefins, as lube oil additives at the same ratio olefin/ester. The sulfurized olefins as additives (Composition 4) are not better than the base oil in the Falex test. The 1:1 physical mixture of sulfurized olefins and esters (Composition 2) is found to be no better than just the sulfurized ester alone. However the 1:1 chemical mixture (Composition 3) of cross-sulfurized ester-olefins is surprisingly superior to all others in the Falex test.

TABLE III

| Cross-Sulfurized Ester-Olefins versue Sulfurized Esters and Olefins | | | |
|---|---|---|---|
| | Mole Fraction Ester | Mole Fraction Olefin | Falex[6] |
| Composition 1[1] | 1.0 | 0.0 | 1250 |
| Composition 2[2] Physical Mixture | 0.5 | 0.5 | 1250 |
| Composition 3[3] Chemical Mixture | 0.5 | 0.5 | 1350[5] |
| Composition 4[4] | 0.0 | 1.0 | 950 |
| Base Oil[7] | 0.0 | 0.0 | 950 |

[1]Tetradecyl-Pentadecyl Tallate, degree of sulfurization is about 9% throughout.
[2]A physical mixture of esters and olefins each separately sulfurized.
[3]Chemical mixtures of esters and olefins (cross-sulfurized ester-olefins.
[4]$C_{14}$-$C_{18}$ cracked wax olefin.
[5]An average of 4 runs.
[6]See Footnotes of Table I.
[7]Base Oil comprises solvent-refined neutral oil, 480 SSU at 100° F.

I claim:

1. A lubricating composition comprising a major proportion of a lubricating oil and from about 0.1 to about 10% by weight of a sulfurized mixture of $C_{10}$-$C_{25}$ olefins with fatty acid esters of $C_{10}$-$C_{25}$ unsaturated fatty acid and a $C_1$-$C_{25}$ alkyl alcohol, in a mol ratio of olefin-to-ester of about 1–2:1.

2. A lubricating composition comprising a major proportion of a lubricating oil and from about 0.1 to about 10% by weight of a sulfurized mixture of $C_{10}$-$C_{25}$ olefins with derosinified tall oil esters of a $C_1$-$C_{25}$ alkyl alcohol in a mol ratio of olefin-to-ester of about 1–2:1.

3. A lubricating composition according to claim 2 wherein the alcohol is a $C_{14}$-$C_{15}$ alcohol and the olefins are $C_{11}$-$C_{18}$ aliphatic olefins.

4. A lubricating composition comprising a major proportion of a lubricating oil and from about 0.1% to about 10% by weight of a sulfurized mixture of $C_{10}$-$C_{25}$ unsaturated fatty acids, $C_1$-$C_{25}$ alkyl alcohol, and $C_{10}$-$C_{25}$ olefins.

5. A lubricating composition according to claim 3 wherein the mol ratio of olefin to acid and alcohol is 1–2:1:1 by weight and the mixture is sulfurized to the extent of 3 to 15% sulfur by weight.

6. A process of producing a cross-sulfurized ester-olefin comprising, the mixing of $C_{10}$-$C_{25}$ unsaturated fatty acids, $C_1$-$C_{25}$ alkyl alcohol and $C_{10}$-$C_{25}$ olefins in the mol ratio of about 1:1:1–2 with sulfur, and reacting said mixture in an inert atmosphere at a temperature of about 160° C to about 180° C.

7. A composition prepared by the method of claim 6.

8. A lubricating composition comprising a major proportion of a lubricating oil and from about 0.1 to about 10% by weight of a sulfurized mixture of $C_{10}$-$C_{25}$ olefins with fatty acid esters of $C_{10}$-$C_{25}$ unsaturated fatty acid and a $C_1$-$C_{25}$ alkenyl alcohol, in a mol ratio of olefin-to-ester of about 1–2:1.

9. A lubricating composition comprising a major proportion of a lubricating oil and from about 0.1 to about 10% by weight of a sulfurized mixture of $C_{10}$-$C_{25}$ olefins with derosinified tall oil esters of a $C_1$-$C_{25}$ alkenyl alcohol in a mol ratio of olefin-to-ester of about 1–2:1.

10. A lubricating composition according to claim 9 wherein the alcohol is a $C_{14}$-$C_{15}$ alcohol and the olefins are $C_{11}$-$C_{18}$ aliphatic olefins.

11. A lubricating composition comprising a major proportion of a lubricating oil and from about 0.1% to about 10% by weight of a sulfurized mixture of $C_{10}$-$C_{25}$ unsaturated fatty acids, $C_1$-$C_{25}$ alkenyl alcohol, and $C_{10}$-$C_{25}$ olefins.

12. A lubricating composition according to claim 10 wherein the ratio of olefin-to-acid and alcohol is 1–2:1:1 by weight and the mixture is sulfurized to the extent of 3 to 15% sulfur by weight.

13. A process of producing a cross-sulfurized ester-olefin comprising, the mixing of $C_{10}$-$C_{25}$ unsaturated fatty acids, $C_1$-$C_{25}$ alkenyl alcohol and $C_{10}$-$C_{25}$ olefins in the mol ratio of about 1:1:1–2 with sulfur, and reacting said mixture in an inert atmosphere at a temperature of about 160° C to about 180° C.

14. A composition prepared by the process of claim 13.

15. A lubricating composition comprising a major proportion of a lubricating oil and from about 0.1 to about 10% by weight of a sulfurized mixture of $C_{10}$-$C_{25}$ olefins with fatty acid esters of $C_{10}$-$C_{25}$ saturated fatty acid and a $C_1$-$C_{25}$ alkenyl alcohol in a mol ratio of olefin-to-ester of about 1–2:1.

16. A lubricating composition comprising a major proportion of a lubricating oil and from about 0.1% to about 10% by weight of a sulfurized mixture of $C_{10}$-$C_{25}$ saturated fatty acids, $C_1$-$C_{25}$ alkenyl alcohol, and $C_{10}$-$C_{25}$ olefins.

17. A process of producing a cross-sulfurized ester-olefin comprising, the mixing of $C_{10}$-$C_{25}$ saturated fatty acids, $C_1$-$C_{25}$ alkenyl alcohol and $C_{10}$-$C_{25}$ olefins in the mol ratio of about 1:1:1–2 with sulfur, and reacting said mixture in an inert atmosphere at a temperature from about 160° C to about 180° C.

18. A composition prepared by the method of claim 17.

19. A lubricating composition comprising a major proportion of a lubricating oil and an extreme pressure improving amount of a cosulfurized mixture of a $C_{10}$-$C_{25}$ olefin with a fatty acid ester of a $C_{10}$-$C_{25}$ unsaturated fatty acid and a $C_1$-$C_{25}$ monohydric alkanol in a mol ratio of olefin-to-ester of about 1–2:1.

20. A method for preparing a sulfurized composition of matter which comprises reacting at about 160°–180° C sulfur with a mixture of a $C_{10}$-$C_{25}$ olefin with a fatty acid ester of a $C_{10}$-$C_{25}$ unsaturated fatty acid and a $C_1$-$C_{25}$ monohydric alkanol in a mol ratio of olefin to ester of about 1–2:1.

21. A composition prepared by the method of claim 20.

* * * * *